Feb. 13, 1968   E. C. BEASON   3,368,930
METHOD AND APPARATUS FOR FORMING TUBES OF THERMOPLASTIC FILM
Filed Oct. 16, 1964
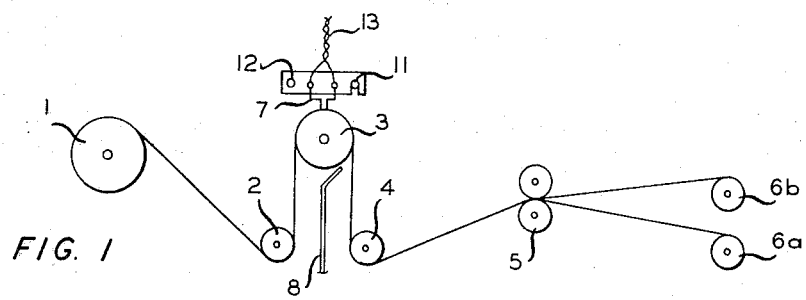
FIG. 1
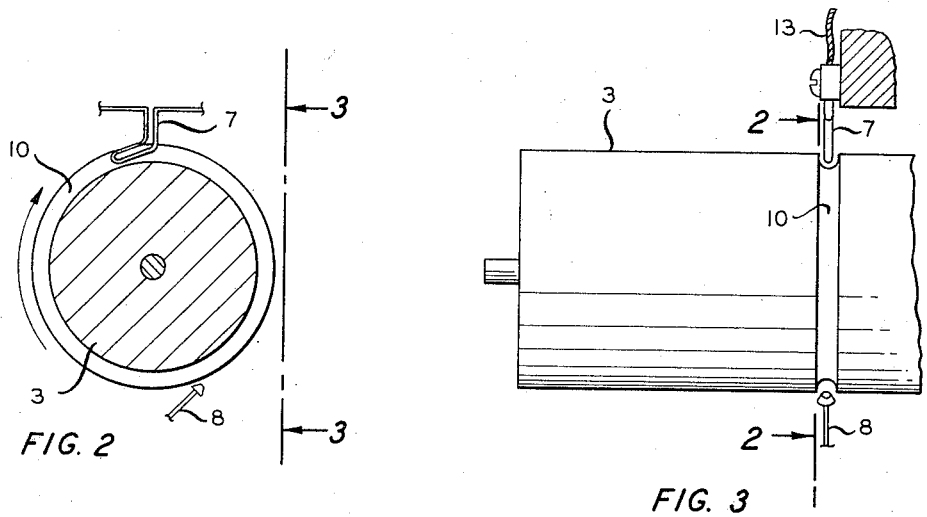
FIG. 2
FIG. 3
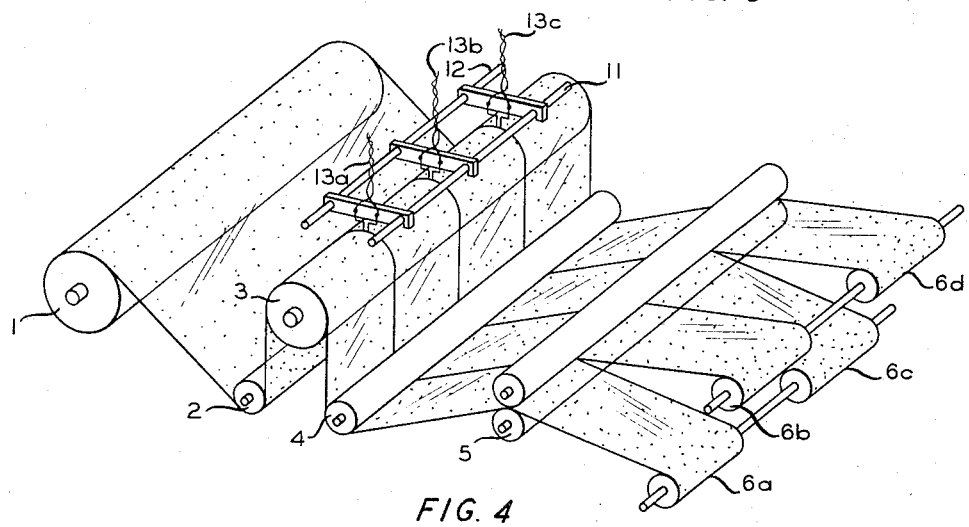
FIG. 4
INVENTOR.
E. C. BEASON
BY *Young & Quigg*
ATTORNEYS

United States Patent Office 3,368,930
Patented Feb. 13, 1968

3,368,930
METHOD AND APPARATUS FOR FORMING TUBES OF THERMOPLASTIC FILM
Elmer C. Beason, Bartlesville, Okla., assignor to Phillips Petroleum Company, a corporation of Delaware
Filed Oct. 16, 1964, Ser. No. 404,332
6 Claims. (Cl. 156—251)

The present invention relates to the production of thermoplastic tubing and in certain aspects concerns an apparatus for the production of a plurality of tubes from a single large diameter "lay-flat" tube. Other aspects of this invention relate to a method and mechanism for the simultaneous cutting and sealing of a plurality of superimposed thermoplastic films or sheets.

Thin films of polyolefins are commercially produced by extruding the polymer through an annular die to form a tube and then expanding the tube to many times its extruded diameter. This expansion is carried out by the use of an air bubble entrapped within the tubing between the extruder die and a pair of pinch rollers. The tubing emerges from the pinch rollers in the form of a flattened web and the product is commonly referred to as lay-flat tubing. The engineering intricacies of this operation are considerable and it is normally desirable to handle as large a tube as possible in order to obtain a maximum amount of film area from each tube-making operation. But while large tubes are desirable in production of the films, commercial applications often require much smaller diameter tubes for use in packaging relatively small individual items. The formation of small diameter tubing by extrusion has been attempted, but such processes have generally been held to be uneconomical when compared with the products of large diameter lay-flat tubing. Earlier inventors have proposed methods and devices for producing a multiplicity of lay-flat tubes from a larger diameter lay-flat tube, but they have been unsatisfactory both as to quantity and quality of the product.

It is the object of this invention to provide an improved apparatus for producing, from a wide web of flattened tubing or lay-flat tubing of heat-fusible materials such as polyolefin film, a multiplicity of strong, clean, relatively small diameter lay-flat tubes.

Another object of this invention is to provide an improved apparatus for simultaneously cutting and sealing the superimposed layers of a plurality of thermoplastic films running continuously and rapidly past the cutting and sealing tool.

A further object of this invention is to provide a lay-flat tube made by sealing a folded sheet of thermoplastic film along its outer extremity or by sealing two sheets of such film along two parallel extremities, such seals or joints being extremely strong and clean.

Another object of the present invention is to provide an improved apparatus for producing high quality thermoplastic tubing by cutting, sealing, and cooling superimposed sheets of thermoplastic film in parallel lines at increased production speeds.

Still another object of the present invention is to provide an improved means of supporting a running web of thermoplastic, polymeric material in proximity to the point or points at which said running web is to be heated, cut, fused and cooled to form at least one lay-flat tube.

Other objects and advantages of the present invention will become apparent to those skilled in the art by reading of this specification and the claims that follow.

According to this invention, a high temperature element is protruded through a multiple-layered web of thermoplastic polymer which is being steadily advanced in such a manner that the temperature of the web in immediate proximity to the heating element is raised above its melting point and severed by the heating element, the molten edges of the severed, superimposed layers then fusing together to form a strong, clean, continuous joint when cooled. In another embodiment, the present invention provides a support for the advancing polymer web near to the point of heating, severing and fusing which consists essentially of a supporting roller having circumferentially disposed grooves or channels suitable to accommodate the abovementioned protruding heating element without combustion damage to the roller.

The invention is further to be understood by referring to the accompanying drawings wherein:

FIGURE 1 is a side view of one embodiment of the invention showing the path of the lay-flat tubing as it leaves the feed roll, moves past the cutting and sealing tool, then past the air cooling jet, and then to the take-up roll.

FIGURE 2 is a close-up side view of the hot wire cutting and sealing instrument and the grooved roller over which the dividing operation takes place.

FIGURE 3 is a view of FIGURE 2 from section 3 showing the groove of the roller and the relative position of the hot wire cutting and sealing instrument.

FIGURE 4 is a perspective view showing a possible production line apparatus, with multiple tubes being made simultaneously.

The lay-flat tubing being supplied by roll 1 is kept taut and unwrinkled against the pressure of the cutting and sealing tool 7 by tension rollers 2 and 4. The nip rollers 5 provide constant-speed locomotion to the film. The hot wire cutting instrument 7 is pivoted at 12 to meet the advancing film layers on roller 3 and is held at a constant level by support 11. The cutting and sealing instrument is resistance heated by a current from electrical wire 13. As the divided tubing passes the hot wire and leaves roller 3 the newly formed joints of the two respective tubes are cooled by an air jet from nozzle 8.

The shape of the element is such to supply enough heat without detrimental loss caused by rapid heat transfer to film. The hot wire cutting and sealing instrument is generally foot-shaped with the toe of the foot outline pointing toward the advancing undivided film. Foot 7 is positioned in the groove 10 of roller 3 in such a manner that the sheets of advancing film contact the hot wire on the forward upper surface or instep of the foot. The advancing film layers are melted and parted around the foot, and the molten edges are simultaneously joined together to form a very strong and clean joint between the superimposed layers. The material of the hot wire instrument 7 can be any high resistance metal wire, which is normally chosen from metal alloys consisting of combinations of nickel and chromium or aluminum, nickel, and cobalt or other such alloys. The wire should be of relatively large gauge, for example, number 14 gauge. The size of the wire is determined by strength requirements and by the surface area heat transfer characteristics required by the cutting and sealing operation. In general, as the thickness and/or speed of the thermoplastic films being cut and sealed increases, more surface area is required of the heating and cutting tool. The shape and position of the cutting and sealing instrument 7 of this invention are also determined largely by the heat transfer requirements. The tangential orientation of the instep of the foot with respect to roller 3 exposes the advancing film layers to a length of the hot wire rather than to only a diameter width. The heat supplied by the sole and the heel of the foot supplements the heating operation and helps to raise the temperature of the film above its melting point as rapidly as possible. It is paramount to note that the apparatus disclosed by this invention employs a heating element or a resistance wire 7 and not a heat sink to transfer heat to the passing film. Another important aspect of this invention as shown in FIGURE 3 is that the wire heating foot actually protrudes through the plane of the film and is thereby enabled to heat, cut, and seal the film simultaneously. The resistance wire 7 employed by this invention is capable of being raised to temperatures approaching 1800–2000° F. while the best methods making use of heat sinks or cutting blades can only attain temperatures in the range of 800–1000° F. This invention is capable of raising the temperature of the film layers far above their melting point very rapidly, which is important in obtaining a strong, uniform, and continuous joint in the layers on either side of the wire. Such high temperatures coupled with the large surface transfer area of the foot design enable the present invention to obtain production rates of 175–200 feet/minute, a substantial increase over speeds previously possible.

Such high production speed is another factor which determines the shape of the heating wire and is very important in positioning the wire in relation to the grooved roller 3 and the running webs. It would normally be expected that the toe of the foot-shaped wire should be pointed in the direction of web movement and the heating and cutting done with the sole of the wire foot, thereby attaining a smoother flow of the web. However, at high speeds this mode of operation is unsatisfactory because, as the on-coming web is heating and elasticized, it tends to "ride" under the wire heater, which results in discontinuous heating and cutting, or "ride" up on the heel of the heater which does not have sufficient heat transfer area to sustain the operation. On the other hand, the shape and orientation of the heating element according to this invention actually enhances the heating and cutting operation by capitalizing upon the elastic "riding" action. Since the on-coming thermoplastic web is met by the positively sloped instep of the wire foot, it is not possible for the web to regress to the extent necessary to "underride." The elasticity of the heated thermoplastic web actually promotes "riding" up the slope of the instep, which increases the wire area contacted by the web and results in more efficient heat transfer and subsequent cutting and fusing.

The material of roller 3 should have substantial heat resistance so the heating element 7 can be positioned in close proximity to the roller without danger of combustion. The material of roller 3 should also have low heat conductivity characteristics so that heat from the element 7 will not be carried by the roller surface to areas of the thermoplastic film remote from the edges to be joined. If such heat conduction is sufficient to raise the thermoplastic sheets above their melting points in places other than the boundaries to be joined, operation of the apparatus would obviously be unsatisfactory. Exemplary materials with suitable properties are low-grade synthetic rubber and wood. The width of groove 10 should provide sufficient clearance between the roller material and the heating element 7 to prevent overheating of the roller 3; however, it is also important that vertical support be supplied to the thermoplastic sheets as near as possible to the element 7 when they are being heated. A suitable size for this groove when the heating element 7 is composed of a No. 14 gauge nichrome wire heater is 3/16 inch deep modified by a 3/16 inch radius trench.

A jet of air from nozzle 8 is directed against the film leaders as the sheets leave roller 3 for rapid cooling of the jointed edges to provide a high strength joint and to avoid depositing molten polyolefin on roller 4 or nip rollers 5. Although the width of heating element 7 is substantial and provides considerable clearance between the divided edges at the point of cutting, at high operating speeds the pressure of roller 4 against the running webs may be sufficient to compress the welded areas at the tubing edges so that the hot joints of the adjacent small tubes meet. Such an event is prevented by lowering the temperature of the thermoplastic film below its melting point between rollers 3 and 4.

In FIGURE 4, roller 3 is shown with a multiplicity of grooves and correspondinng heating, cutting, and cooling means. Also, FIGURE 4 shows a design scheme for separate take-up rolls for each of the newly produced plastic tubes in the scheme depicted, rolls 6a and 6c share a common axis as do rolls 6b and 6d. Such a take-up scheme is not required by this invention but may be used to advantage with it.

Various modifications and alterations of this invention will become apparent to those skilled in the art without departing from the scope and spirit of this invention, and it should be understood that this invention is not to be limited unduly to that set forth herein for illustrative purposes.

I claim as my invention:

1. For use in forming a plurality of tubes of thin gauge heat fusible polymeric material from a single large diameter continuous traveling tube flattened to form a web having upper and lower layers, a high temperature element protruding through said web to raise the temperature of said web above its melting point and to sever the web along the heated area as the web is advanced past said heating and severing element, said high temperature element having a generally foot shaped configuration with the toe pointing toward the advancing undivided web and being positioned such that the instep or forward upper surface of the foot shaped heating element contacts the advancing web.

2. For use in forming a plurality of tubes from thin gauge, heat-fusible, polymeric material in the form of a single large diameter tube flattened to form a web having upper and lower layers, a high temperature heating wire protruding through said web layers for raising the temperature of the layers closely adjacent to said heating wire above the melting point of said polymeric material, so that said web layers fuse together in the heated area, and means to advance said web layers past said heating wire so that the heated and fused area is extended longitudinally and is simultaneously severed by said heating wire, said heating wire having a generally foot shaped configuration with the toe pointing toward the advancing undivided web and being positioned such that the instep or forward upper surface of the foot shaped heating wire contacts the advancing web.

3. For use in supporting at any instant on at least a portion of its circumference thin gauge, heat-fusible polymeric material in the form of a single, large diameter tube flattened to form a web having upper and lower layers which are to be severed and fused longitudinally to form at least one tube; a right cylindrical roller having a surface fabricated of a heat resistant, heat insulating material, said roller having at least one groove or channel around its circumference suitable to accommodate, without danger of heat damage to said roller, a heating element at 1500–2000° F. protruded through the plane of said supported web of polymeric material, said heating element being a curved wire having a single plane of curvature which is parallel to the circular cross-section of said right cylindrical roller, said heating element having a generally foot shaped configuration with the toe pointing toward the advancing undivided web and being positioned such that the instep or forward upper surface of the foot shaped heating element contacts the advancing film.

4. Apparatus for continuously forming at least one thin-walled tube of a heat-fusible and heat-sealable thermoplastic material such as polyethylene from a continuous traveling web having two layers adjacent and parallel to one another, comprising, in combination, means for advancing said adjacent and parallel layers at a constant and uniform rate, a roller which supports the said advancing layers, said roller having a groove or channel positioned around its circumference in such a manner as to accommodate a heating wire which may be placed in position relative to said roller so that said heating wire protrudes through the plane of said advancing web, thereby raising the temperature of said web in immediate proximity above its melting temperature and cutting said web along the heated areas as the layers of tubing are advanced past the heating wire in such a manner that the heated and severed edges of said thermoplastic layers are fused together and form clean, strong, continuous joints, said heating wire having a generally foot shaped configuration with the toe pointing toward the advancing undivided web and being positioned such that the instep or forward upper surface of the foot shaped heating wire contacts the advancing web.

5. Apparatus for continuously forming at least one thin-walled tube of a heat-fusible and heat-sealable thermoplastic material such as polyethylene from a continuous traveling web having two layers adjacent and parallel to one another, comprising, in combination, a high temperature heating element such as a high resistance wire, said heating wire being bent to form a curvature in the center and two relatively parallel shanks, the center of said wire curvature being displaced parallel to the plane of said relatively parallel shanks, the resulting shape of said wire heating element resembling the outline of a foot; means for advancing said adjacent and parallel layers of continuous traveling web over and tangential to a part of a roller's circumference, said roller having a groove or channel around its circumference suitable to accommodate the abovementioned shaped wire heating element, said wire heating element being lowered into said channel or groove in such a manner that the toe and arch of said foot-shaped heating element are within the confines of said groove or channel, and the instep or forward, upper surface of said foot-shaped heating element is directed toward the advancing thermoplastic web layers and is transverse to the planes of travel of said advancing thermoplastic layers, said foot-shaped heating element being heatable to about 1500–2000° F. without damage by electrical current, said advancing thermoplastic layers thus being heated above their melting point and severed by said wire heating element so that the heated and severed edges are fused together in a strong, clean, continuous joint, means to direct a current of air against said heated, severed, and fused edges so the temperature is rapidly decreased below the melting temperature of said thermoplastic web layers, and spacing a plurality of such heating elements, grooves, and cooling means so that a corresponding plurality of pairs of severed and jointed edges are achieved and a multiplicity of small diameter tubes results.

6. A method of continuously forming at least one thin-walled tube of a heat-fusible and heat-sealable thermoplastic material such as polyethylene from a continuous traveling web having two layers adjacent and parallel to one another which comprises: advancing said thermoplastic material past a heating element at 1500–2000° F. so that said heating element is protruded through said continuously advancing layers, heating and severing them along a path essentially parallel to the direction of travel of said advancing layers in such a manner that the heated and severed edges are fused together to form a clean, strong, continuous joint when cooled, said advancing web being passed over said heating element in a tangential relationship to said heating element such that the area of contact between said advancing web and said heating element is over a length of said heating element.

References Cited
UNITED STATES PATENTS

| | | | |
|---|---|---|---|
| 2,805,973 | 9/1957 | Klasing et al. | 156—271 |
| 3,015,600 | 1/1962 | Cook | 156—515 |
| 3,142,608 | 7/1964 | Techtmann et al. | 156—583 |
| 3,216,880 | 11/1965 | Herrington et al. | 156—515 |

DOUGLAS J. DRUMMOND, *Primary Examiner.*